Aug. 4, 1925.

A. C. TAYLOR 1,548,397

ELECTRIC WELDING MACHINE

Filed Jan. 16, 1925   3 Sheets-Sheet 1

Inventor

A. C. TAYLOR.

Attorney

Aug. 4, 1925.
A. C. TAYLOR
1,548,397
ELECTRIC WELDING MACHINE
Filed Jan. 16, 1925  3 Sheets-Sheet 2
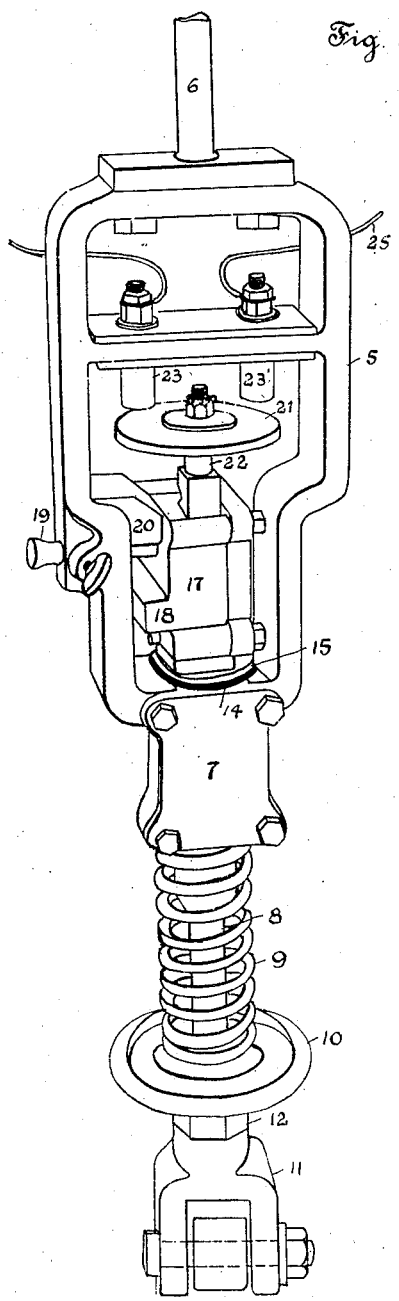
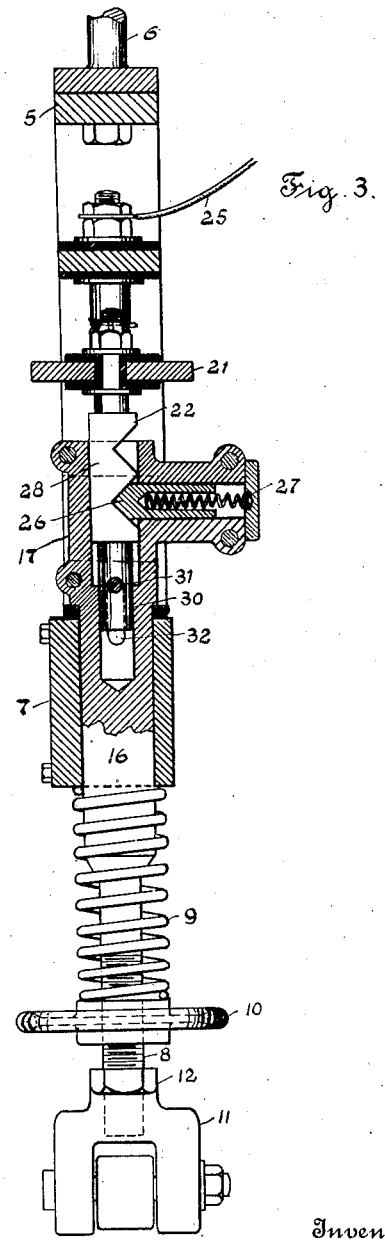
Inventor
A. C. TAYLOR
By Fisher, Moser & Moore
Attorney Aug. 4, 1925.

A. C. TAYLOR 1,548,397

ELECTRIC WELDING MACHINE

Filed Jan. 16, 1925   3 Sheets-Sheet 3

Inventor

A.C. TAYLOR.

Attorney

Patented Aug. 4, 1925.

1,548,397

UNITED STATES PATENT OFFICE.

ALBERTIS C. TAYLOR, OF WARREN, OHIO.

ELECTRIC WELDING MACHINE.

Application filed January 16, 1925. Serial No. 2,714.

*To all whom it may concern:*

Be it known that I, ALBERTIS C. TAYLOR, a citizen of the United States, residing at Warren, in the county of Trumbull and State of Ohio, have invented certain new and useful Improvements in an Electric Welding Machine, of which the following is a specification.

My invention relates to an improvement in electric welding machines, and the improvement resides more particularly in the pressure-applying and electric-current switching parts hereinafter shown and described whereby the pressure on the work and the passage of the electric welding current may be conveniently regulated and sensitively controlled to produce equally satisfactory welds in either light or heavy stock.

In that connection it should be understood that the steps taken in welding light material differ somewhat from the steps followed in welding heavy plates or where the stock does not fit close together and is liable to spring apart before the molten metal has had time to solidify, and that the present improvement is designed to permit such alternative steps to be practiced with the same appliances by simply shifting a single element or part of the controlling mechanisms.

Figure 1:
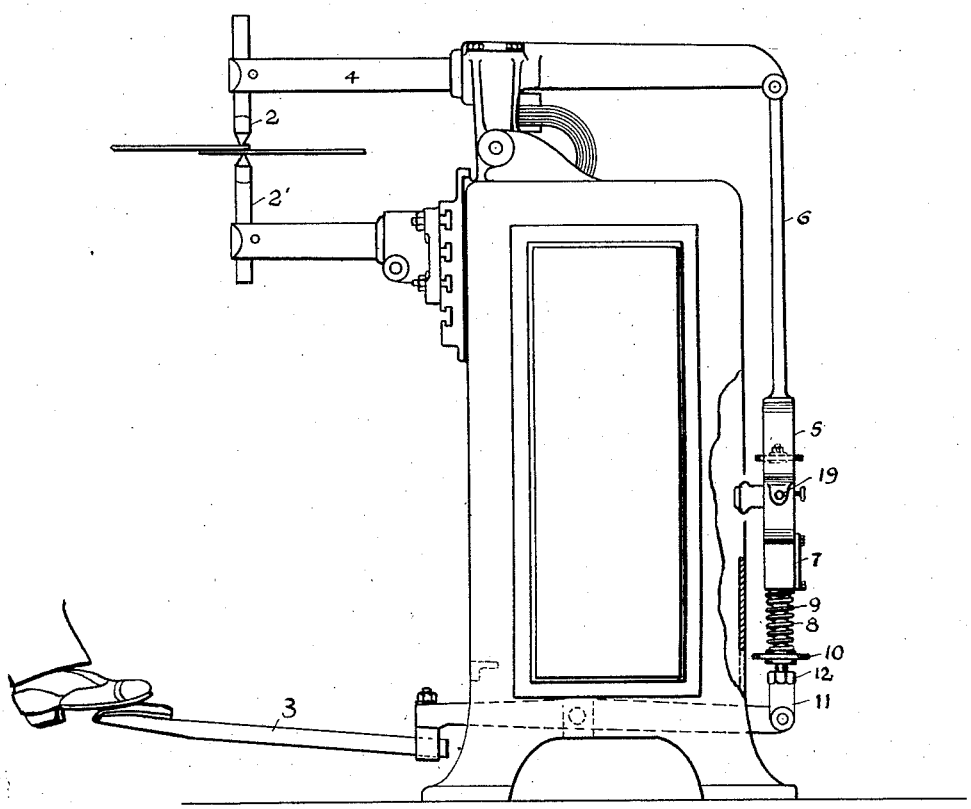
Figure 4:
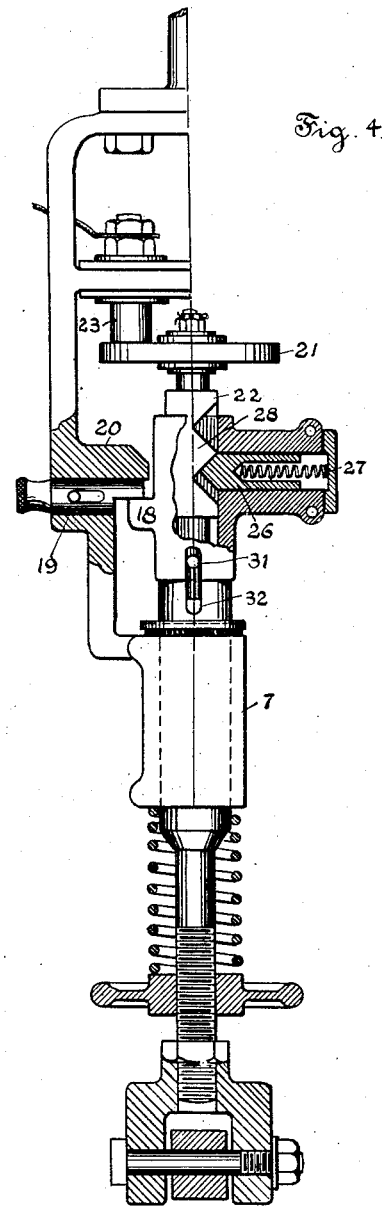
Figure 5:
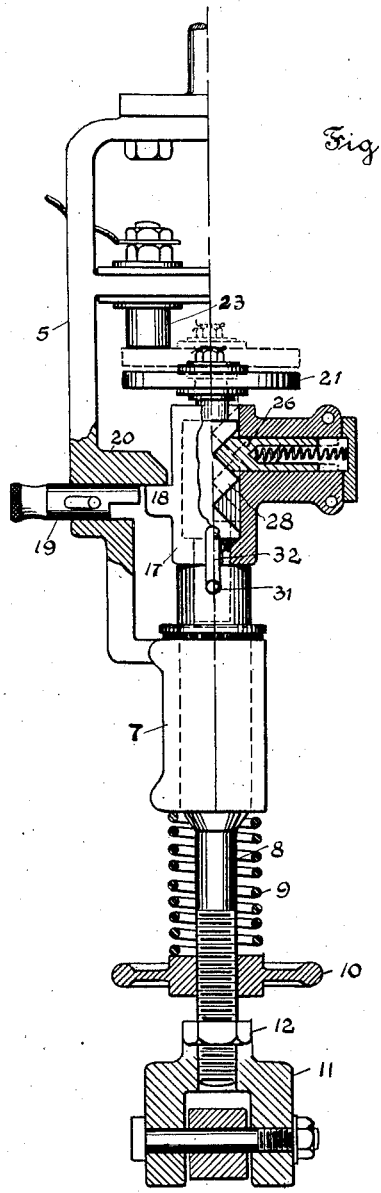

In the accompanying drawings, Fig. 1 is a side elevation of electric spot or point welding machine embodying my improvement. Fig. 2 is a perspective view of the combined connecting rod and switch, and Fig. 3 is a vertical section of the same. Figs. 4 and 5 are schematic views of the combined connecting rod and switch, showing the same working parts in different operating positions and settings as hereinafter more definitely described.

The present invention is especially applicable to welding machines of the type exemplified in Fig. 1, wherein the parts to be welded are clamped between a pair of electrodes 2—2' by pressing down upon a foot treadle 3 which is connected to a pivoted supporting member 4 for upper electrode 2. To make a good weld the pieces to be joined must first be brought into close contact between the welding electrodes prior to switching on the electric current, and the present operating connection between treadle 3 and tilting member 4 comprises a coupling yoke 5 carrying a set of switch contacts adapted to close and open the electric welding circuit automatically at intervals during pressure applying operations. Thus yoke 5 has a rigid connecting rod 6 at its upper end which is pivotally secured to tilting member 4, and the lower reduced end of the yoke comprises a box 7 in which a second connecting rod 8 is adapted to slide vertically within limits against the expanding force of a coiled compression spring 9. The reduced lower portion of connecting rod 8 is screw-threaded to carry an adjusting nut or hand wheel 10 for changing the tension of the spring, and a treadle 3 is pivotally connected to a forked coupling member 11 also adjustably screwed to rod 8 and fixed thereto by a lock nut 12. A leather washer 14 within a flanged metal ring 15 is sleeved on the enlarged round portion 16 of rod 8 above the flat top of box 7 to cushion the seating of the enlarged head 17 of rod 8 when the treadle is suddenly released and spring 9 forces connecting rod 8 downward. The upward movement of the rod within the box in respect to yoke 5 is limited by a stop lug 18 at one side of head 17 where it is adapted to engage either a stop pin 19 or a second stop lug 20 on the yoke. When stop pin 19 is pressed inward its inner flattened end is projected in the path of lug 18 where it will be engaged to force the yoke upwardly without any further yielding movement on the part of spring 9, thereby permitting the operator to apply a positive pressure through the foot treadle to the work clamped between the electrodes. However before either pin 19 or stop lug 20 is engaged by lug 18, the electric current is switched on by the upward movement of head 17 within yoke 5.

Head 17 does not begin to move within the yoke until the parts to be welded are first clamped between the electrodes by an initial tilting of pivoted member 4; thenceforth as spring 9 is compressed by continuing the pressure on treadle 3 a yielding spring pressure is transmitted to the work as head 17 rises. Before lug 18 strikes pin 19 or lug 20, a copper contact disk 21 carried on a ratchet stem 22 within the upper end of head 17 engages a pair of copper contact studs 23—23' supported side by side in an insulated position upon a cross or bridge piece 24 within yoke 5, thus switching on the electric current over suitable electric conductors 25 connected to the welding circuit of which an electric welding transformer and the electrodes 2—2' form a part as well understood to those skilled in the art.

When electric contact is established between disk 21 and contact studs 23—23' the upward movement of the disk is arrested for the time being but head 17 continues to rise until lug 18 strikes either pin 19 or stop lug 20. Assuming pin 19 is in an intercepting position it is obvious that the upward movement of head 17 in respect to the arrested disk, will be less than if said stop pin is withdrawn. If withdrawn lug 18 will rise an additional distance before striking lug 20. This difference in movement is utilized to permit the same switch parts to be used in welding different kinds of work, either to apply positive pressure to the work while the electric current is on and heating of the work is proceeding, or to apply spring pressure to the work while the electric current is heating the work and then switching off the current automatically while continuing the application of pressure for a longer period if desired. Where the work is heavy and the parts do not fit together, or require considerable pressure to make good contact at the desired point of weld, automatic tripping of the switch is not desirable unless positive pressure can be immediately applied before the molten metal has had time to solidify.

In the present device contact disk 21 is adapted to be upheld in two different positions by a beveled dog 26 which is pressed constantly against the toothed side of ratchet stem 22 by a spring 27. Thus, when the disk is in its highest elevated position in respect to head 17 the dog occupies a V-shaped interspace beneath a reversely-beveled tooth 28 on stem 21, see Fig. 3. Then as head 17 rises the disk will strike the contact studs 23—23' and be slightly arrested before lug 18 reaches stop pin 19, dog 26 yielding in part but not retiring sufficiently to permit its beveled end to be withdrawn entirely from the lower interspace providing the stop pin intercepts lug 18. In that event spring 27 behind the dog presses the beveled end of the dog constantly against the underside of beveled tooth 28, thereby holding disk 21 in constant engagement with the contact studs while pressure is being applied through the electrodes to the work. When stop pin 19 arrests lug 18 for positive pressure operations, the contact between the disk and studs continues as long as the pedal pressure is maintained. When this pressure is relieved head 17 is lowered within the yoke by main spring 8 while the spring-pressed dog 26 holds the contact disk momentarily against the studs. A further downward movement of the head under the action of spring 9 then causes the disk to be lowered with the head, thereby separating the disk from the contact studs and cutting off the electric current from the electrodes while they are still held in clamping engagement with the work due to the upward pressure of main spring 9 on yoke 5. When the base portion 29 of head 17 strikes cap 15 of cushioning washer 14 the yoke is carried down with head 17 and its connecting rod 8 and the electrodes are released from the work and the weld is completed.

But assume that the nature of the work or stock permits the production of a good weld by the application of a stiff spring pressure while passing an electric welding current through the welding electrodes. In that case, stop pin 19 may be withdrawn to permit head 17 to travel an additional distance until lug 18 strikes lug 20 on yoke 5. That additional travel of the head suffices to force dog 26 farther outward until the beveled point of the dog passes slightly beyond and above the high point of tooth 28, whereupon spring 27 behind the dog will press the dog inward and cause its beveled end to ride upon the upper beveled part of tooth 28 thereby forcing ratchet stem 22 and contact disk 21 downwardly with a snap movement. Head 17 may still be rising until its stop lug 18 strikes lug 20, (see Fig. 5), but the effect is to cut off the electric current automatically with a quick break at the contact studs while pressure is still being applied to the work by the electrodes and main spring 9. A positive and unyielding upsetting pressure may then be applied if desired after the electric current is switched off because lug 18 on head 17 is in an engaging position with lug 20 on yoke 5.

The weld being completed under those conditions it now remains to restore contact disk 21 to its original or normal operating station above head 17. This is accomplished when the pressure of the foot on treadle 3 is relaxed and yoke 5 and head 17 are permitted to descend together. The first part to move downwardly will be head 17, spring 9 pressing downwardly on nut 10 and upwardly on yoke 5. Contact disk 21 is carried downward with head 17 and the dog or bolt 26 now extends into the interspace above beveled tooth 28. A round guiding extension 30 at the bottom of ratchet stem 22 slides within a bore in head 17, and a pin 31 on extension 30 projects laterally through a vertical slot 32 within one side of head 17 where its exposed end may strike the metal cap 15 during the downward movement of head 17 within yoke 5. When pin 31 engages cap 15 the downward movement of ratchet stem 22 and disk 21 is arrested but dog or bolt 26 is carried downwardly with the head until the base of the head also strikes cap 15 which rests upon washer 14. As a result dog 26 is pressed outwardly until its beveled end rides over the point of tooth 28 and engages the beveled underside of the tooth whereupon spring 27 behind the dog presses the dog outward and the ratchet stem upward until the beveled end of the dog again rests in the lower V-shaped interspace. The contact disk is now raised in respect to head 17 and is in the same position as at the beginning before the welding operation took place, and consequently the same operations may be repeated. However, when stop pin 19 is not withdrawn but is in an intercepting position above stop lug 18 instead, the contact disk is not subjected to the trip movements described but merely surrenders sufficiently under the spring action of dog or bolt 27 to establish good electrical contact between the disk and studs. The disk is preferably mounted in loose connection with the upper end of the ratchet stem to permit a slight wobbling or equalizing movement to take place when contact is established with the two studs, and the disk and contact studs are preferably insulated from each other and their respective supporting parts. In practice the switch and coupling parts are enclosed within a housing attached to the rear of the welding machine, but as this housing is not a material part of the invention it has been omitted from the drawings to more clearly portray the working arrangement described herein.

What I claim, is:

1. An electric welding machine, comprising a pressure welding electrode, operating connections for said electrode, an electric switch, an automatic tripping device for said switch, and means associated with said operating connections adapted to permit or prevent automatic tripping of said device alternatively at the election of the operator.

2. An electric welding machine, comprising a movable welding electrode, means adapted to operate said electrode either with a positive or yielding pressure, an electric switch associated with said operating means adapted to switch on the electric current automatically in applying pressure, a device adapted to trip said switch to cut off the electric current automatically in applying a yielding pressure, and means adapted to prevent automatic tripping of said switch in applying a positive pressure.

3. An electric welding machine, comprising a welding electrode, means adapted to press said electrode into engagement with the work either with a yielding or positive pressure, an electric switch associated with said means adapted to switch on the electric current automatically subsequent to pressing the electrode into engagement with the work, said pressing means being adapted to apply pressure with yielding effect initially and positive effect finally, and a tripping device for said switch adapted to cut off the electric current during the application of yielding pressure immediately prior to the application of positive pressure.

4. An electric welding machine, comprising a welding electrode, operating connections for said electrode having a spring adapted to permit a yielding pressure to be applied to said electrode, an electric switch associated with said connections adapted to make and break the electric circuit for said electrode automatically, and an adjustable element adapted to arrest the yielding action of said operating connections in applying pressure to said electrode.

5. An electric welding machine, comprising a movable welding electrode, spring-yielding operating connections for said electrode having fixed stops adapted to provide positive operating connections, an electric switch associated with said connections adapted to automatically open and close an electric welding circuit for said electrode upon actuating said connections, a tripping device for said switch adapted to be activated during the spring-yielding movement of said operating connections, and a shiftable element adapted to be interposed between said fixed stops to limit the yielding movement in said connections and to prevent activation of said tripping device.

6. An electric welding machine, comprising a movable electrode, and manually operable means for said electrode, including a coupling member having spring-yielding parts, an electric trip switch adapted to be operated by the movement between said yielding parts, and a device adapted to be shifted to intercept the movement between said parts and to prevent tripping of said switch.

7. An electric welding machine, comprising a movable electrode, and means adapted to operate and apply pressure to said electrode, comprising a yoke embodying an electric trip switch, a coupling member movably connected to said yoke, a compressing spring interposed between said yoke and coupling member, co-operating stops adapted to limit the movement between said yoke and coupling member, one of said stops being shiftable to vary the movement and thereby control the tripping of said switch.

8. An electric welding machine, comprising a movable welding electrode, and means adapted to press the same to the work comprising a yoke having a movable coupling member, a compression spring interposed between said yoke and coupling member, a set of changeable stops adapted to vary the movement of said yoke and coupling member relatively to each other, and an electric switch and tripping mechanism controlled by the variable movement of said yoke and member as fixed by said stops.

9. An electric current controlling and pressure-applying device for a welding machine, comprising movably-related coupling members, a spring interposed between said members, a switch member and tripping mechanism therefor carried by one of said members and switch contacts carried by the other member, and an adjustable stop adapted to limit the movement of said member relatively to each other and to control tripping operations of said switch member.

10. An electric current controlling and pressure applying device for a welding machine, comprising two coupling members adapted to move in the same direction under the yielding action of a compression spring and stops adapted to limit the relative movements of said members and the degree of compression imparted by said spring, including a shiftable stop element adapted to vary such relative movements, and electric switch elements connected with said movable members having a tripping device operatively dependent upon the relative movements between said members.

11. An electric current controlling and pressure-applying device for a welding machine, comprising a coupling member carrying an electric element, a second coupling member movably related to said first member, a spring adapted to resist the movement between said members, a movable switch element tripping device therefor carried by said second member, a pair of stops adapted to limit the spring-pressed movement of said coupling members, and a shiftable stop element co-acting with said stops to control the tripping movements of the movable switch element.

12. An electric current controlling and pressure-applying device for a welding machine, comprising a coupling yoke and rod slidably connected together, a compression spring between said coupling parts, adjustable means to vary the tension of said spring, a tripping switch element having a toothed support movably mounted upon one of said coupling parts, a spring pressed dog engaging said toothed support, a switch element upon the other coupling part adapted to coact with said tripping switch element, and means adapted to limit the sliding movement of said coupling parts.

13. An electric current controlling and pressure-applying device for a welding machine, comprising a yoke having switch contacts thereon, a coupling rod slidably connected with said yoke, a coiled spring sleeved upon said rod and engaging said yoke, a contact disk having a stem slidably supported upon said coupling rod, ratchet and spring mechanism adapted to trip said disk, and stops on said rod and yoke adapted to limit the sliding movement therebetween, including a shiftable stop element.

14. An electric current controlling and pressure-applying device for a welding machine, comprising a yoke having a box at one end, a coupling rod extending through said box having a head, a compression spring sleeved upon said rod in engagement with said yoke, electric switch elements carried by said yoke and head and operatively dependent upon the yielding movement therebetween, and a cushioning member interposed between said yoke and head.

15. An electric current controlling and pressure-applying device for a welding machine, comprising a coupling yoke and rod slidably connected together, a compression spring interposed between said parts, means adapted to vary the tension of said spring, an electric trip switch mounted upon said coupling parts, said parts having a limited movement in respect to each to permit tripping of said switch and positive pressure-applying operations subsequently thereto, and means adapted to limit the movements of said coupling parts in respect to each other to permit pressure-applying operations without tripping said switch.

In testimony whereof I affix my signature.

ALBERTIS C. TAYLOR.